Patented July 28, 1931

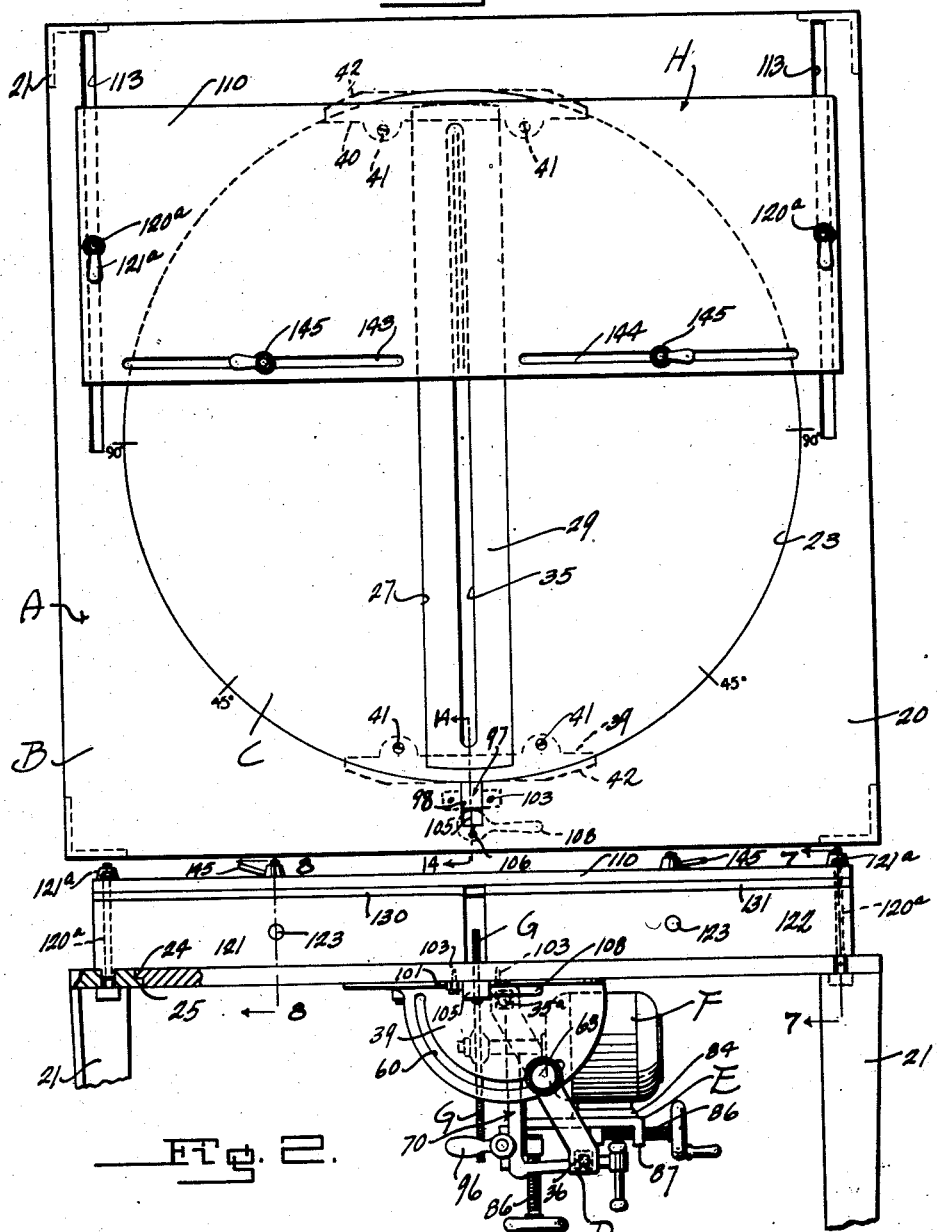

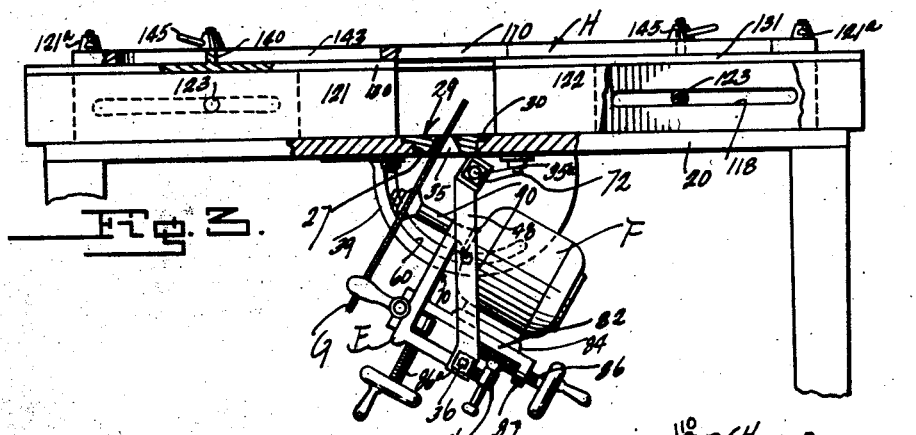

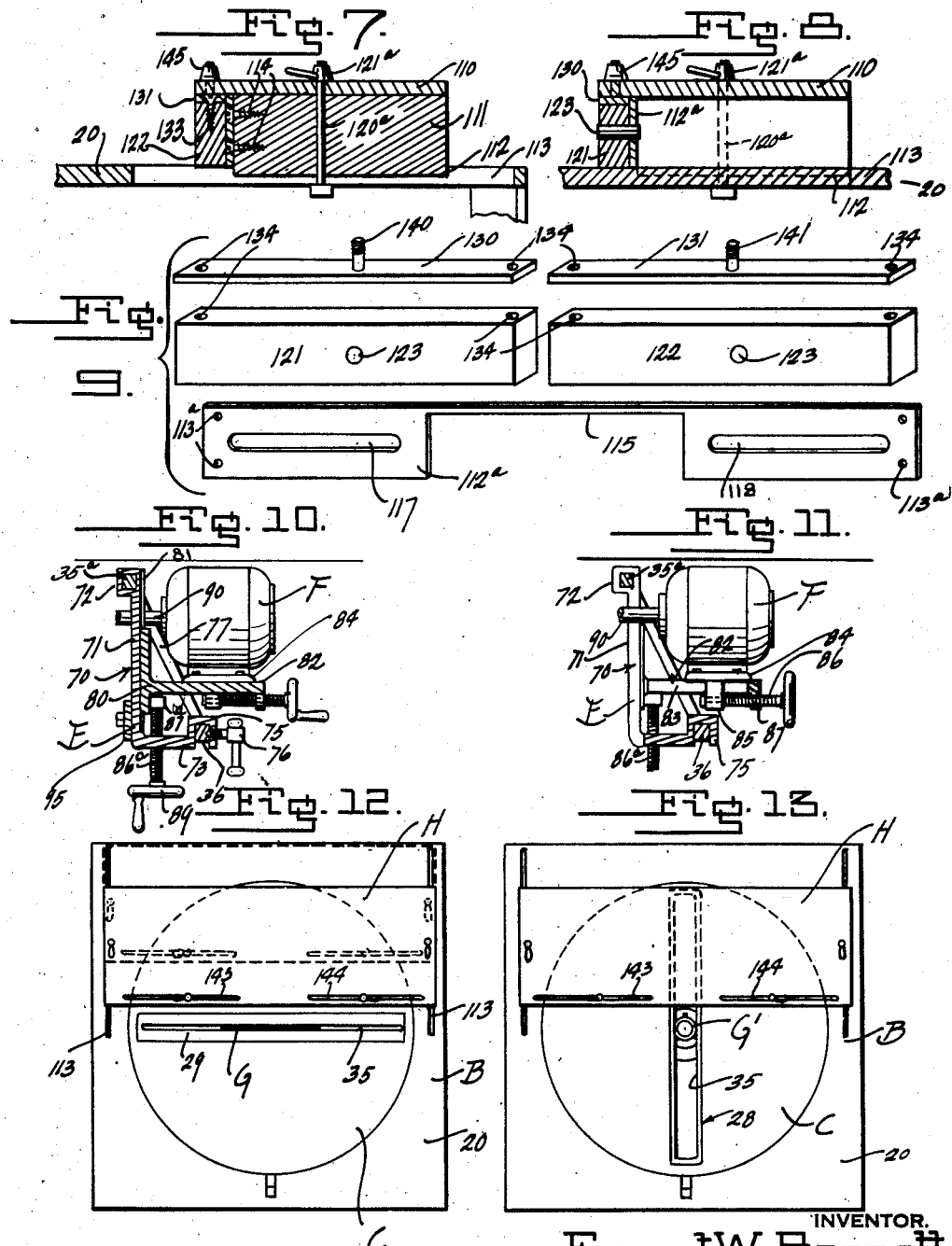

1,816,069

UNITED STATES PATENT OFFICE

ERNEST W. BENNETT, OF OTTUMWA, IOWA

WOODWORKING MACHINE

Application filed November 2, 1928. Serial No. 316,745.

This invention relates to improvements in woodworking machines or attachments.

The primary object of this invention is the provision of an improved machine consisting of a rotatable support upon which sawing or woodworking mechanism is movably mounted for bodily rotation therewith; the rotatable support comprising a table below which the saw is mounted, in such manner that work may be placed upon the top of the support and operated upon, without hindrance by details of the tool operating mechanism, and in a safe and efficient manner.

A further object of this invention is the provision of improved machine including a turntable below which operating mechanism is adjustably positioned in such relation that the tool may operate above or thru the plane of the top surface of the turntable, in order to make straight, miter, bevel, compound, shaping, or other cuts upon work.

Other objects and advantages of this invention will be apparent from the following detailed description.

In the accompanying drawings, forming a part of this specification, and wherein similar reference characters designate corresponding parts throughout the several views, Figure 1 is a plan view of the improved machine.

Figure 2 is a front elevation, partly in section, of the improved machine.

Figures 3 and 4 are views, partly in section, illustrating various positions and adjustments for sawing and cutting of the work.

Figure 5 is a fragmentary view, partly in section, showing the saw of the machine in position for rip sawing.

Figure 6 is a perspective view of a clamping piece adapted to hold the saw supporting turret in a stationary relation in the frame in which it is mounted.

Figures 7 and 8 are sectional views taken substantially on their respective lines in Figure 2 of the drawings.

Figure 9 is a perspective view of disassembled details of the saw guard and work guide used with this invention.

Figures 10 and 11 are fragmentary views, partly in section, showing related and adjustable details of the tool mandrel carriage and its mounting features.

Figure 12 is a plan view showing the relation of sawing details, as arranged for rip sawing purposes.

Figure 13 is a plan view showing the relation of details as they are positioned when shaping, or tenoning strips of lumber or pieces of work.

Figure 14 is a sectional view taken substantially on the line 14—14 of Figure 1.

In the drawings, wherein for the purpose of illustration is shown only a preferred embodiment of the invention, the letter A may generally designate the improved machine, which may include a supporting table B having a turn-table C rotatably supported thereon. The turn-table C therebelow is provided with a diametrically disposed trackway arrangement D upon which a carriage E is longitudinally slidable. The carriage E adjustably supports a motor F which has a circular saw or other wood cutting tool or implement G rotatably connected for operation therewith. This mechanism is all below the table. Cooperably and adjustably disposed over the table portions of the frame B and turn-table C is a saw guard, work guide and back stop device H.

The frame B may be a special table or a carpenter's work-bench, and it includes the table portion 20, supported by legs 21 in any approved and convenient manner. This table portion 20 is provided with a central opening 23 therein, wherein the turn-table C is rotatably positioned; the turn-table C having a reduced peripheral flange 24, which seats on the reduced flange 25 at the lower part of the opening 23, in order to position the upper surface of the turn-table C flush with the top of the table portion 20. The turn-table C is provided with an elongated opening 27 diametrically thereacross, terminating just short of its peripheral edge, within which metal work rest inserts 28 or 29, are seated; the same being peripherally flanged at 30, for seating on the reduced shoulders provided about the opening 27, as shown in Figures 3 and 4, and elsewhere, so that the upper surfaces of the inserts 28 and 29 lie flush with the upper surface of the turn-table. These inserts 28 and 29 are provided with slots 35 axially thereof, which may vary in cross section, and thru which slots the saw blade or other tools or parts are adapted to operate in any of various positions, to produce straight, or bevel, or miter cutting operations upon the work supported by the table.

The trackway arrangement D is adapted to slidably support the saw carriage. It consists of spaced parallel rails 35ᵃ and 36, the former of which has reduced ends 37 and 38 respectively pivoted in front and rear brackets 39 and 40, connected in a rigid relation upon the turn-table C, at opposite ends of the slotted insert; said brackets being connected as shown at 41, on the turn-table, by means of screws or the like, so that portions of the brackets overlap at 42 beneath the lower surface of the table portion 20, to prevent lifting of the turn-table upwardly, except when the brackets 39 and 40 are detached. The ends of the rail 35ᵃ are pivoted in said front and rear brackets just below the turn-table C. In cross section the rails 35 and 36 are square, or polygonal, and front and rear supporting arms 48 and 49 are connected on the ends of the track or rail 35ᵃ immediately at the inside surfaces of the brackets 39 and 40 respectively; said arms 48 and 49 having polygonal openings 50 therethrough for receiving the polygonal section of the rail 35ᵃ, so that the arms will turn with the rail 35ᵃ. The opposite ends of said arms 48 and 49 are provided with openings receiving the reduced ends 52 of the other rail 36. It is thus noted that the rail 35ᵃ is pivoted on its axis upon the brackets 39 and 40, so that the arms 48 and 49 may swing about said axis.

The brackets 39 and 40 are of segmental shape, and adjacent their peripheral portions are provided with arcuated slots 60, shown in Figure 2 and elsewhere, concentric with the pivot axis of the rail 35ᵃ; said slots 60 respectively having pin portions, carried by the arms 48 and 49, operating therein. Thus, the arm 49 has an extension pin 61 which slides in the slot 60 of the rear bracket 40, and a clamping screw 63 is provided with a threaded connection 64 between the ends of the arm 48, with a reduced portion 65 operating in the slot 60 of the front bracket 39; the outer portion of the screw 63 being enlarged and adapted to clamp the arm 48 rigid against the bracket 39 to hold the frame rails in a predetermined position, for a particular sawing or cutting operation.

Referring to the carriage E, the same includes a substantially L-shaped body 70, including a plate portion 71 having an end provided with a polygonal shaped sleeve or box 72 non-rotatably positioned for sliding along the rail 35ᵃ. The body 70 also includes a shorter plate portion 73 at right angles with respect to the plate portion 71, and at its free end having a socket piece 75 adapted for non-rotatable sliding along the other rail 36. As shown in Figure 10, this socket piece 75 may have a clamping screw 76 secured therewith adapted to be adjusted into engagement with the rail 36 to hold the carriage construction E against movement along the trackway arrangement D. Diagonal braces 77 secure the plate portions 71 and 73 of the body 70 at the rail engaging ends thereof. The carriage frame 70 slidably supports an L-shaped motor supporting carriage 80, which has a dove-tail connection in vertical slots 81 provided in the plate portion 71 of the body 70; the motor supporting carriage 80 including a right angled shelf 82 rigid therewith, which is provided with a slot 83 therethrough. As shown in Figure 5 the base 84 of the motor F has a dove-tailed connection in the shelf 82, for sliding therealong towards and away from the plate portion 71, and the motor base 84 has a lug 85 depending through the slot 83 to which is rotatably connected a feed screw 86, which has a screw threaded connection at 87 in the outer end of the shelf 82, as shown in Figure 11.

So that the motor support 80 may be moved relatively along the plate 71, a screw 86ᵃ is provided, having a screw threaded connection in the plate portion 73, and at its upper end secured at 87ᵃ to the carriage 80, and at its lower end being provided with a hand wheel 89, or the like, to permit its rotation. Thus, it is apparent that on the body 70 the motor F may be adjusted in two directions, at right angles to each other.

The motor F has a mandrel 90 to which the saw G or shaping tool G' may be detachably connected at the opposite side of the plate 71 with respect to the motor F, as is shown in various views of the drawings.

As shown in Figure 2, the saw G may be positioned for straight cut sawing, with the saw projecting upwardly thru the slot 35 in the turn table, for cutting work positioned upon the top of the table. In this position of parts the axis of the motor shaft is horizontal; the circular saw G in a vertical plane; and the rail 36 of the track way D is held in a position below and to the right of the upper rail 35ᵃ by clamping adjustment of the screw 63 in the relation above mentioned. If a bevel cut is to be made in the work supported on the top of the table, the carriage must be swung to the left by releasing the screw 63 until the saw G has been positioned at the desired angularity, which is shown in Figure 3. This positions the rail 36 below the rail 35ª, and the rails may be clamped in the desired position by means of the screw 63; it being understood that the rails may move to this position in a guided relation thru the slots 60 of the rail supporting brackets. For grooving, routing, and other operations well understood in this art, it may be desired to have the woodworking tool positioned in a vertical plane above the turn-table. To this end, the mandrel 90 must then be vertically positioned, and for this accomplishment the carriage and trackways are swung to the extreme left until the mandrel 90 is vertically positioned, and the carriage and trackways are then clamped by the screw 63 in the position shown in Figure 4, with the operating tool above the work supporting surface of the turn-table and table 20, for operation upon work in a manner which will be apparent to those skilled in the art to which this invention relates. For this work, it is to be noted that the insert 28 has been substituted in the slot of the turn-table in lieu of the insert 29, which latter is used for bevel cutting, and has an inverted V-shaped slot 35 therein. The slot of the insert 28, however, is wider, as shown in Figure 4. It is thus apparent that not only may the cutting tool be adjusted on the carriage in two directions, that is, at right angles to each other, but the entire carriage may be bodily moved to adjust the operating tool in a relation which adapts the same for different operations upon the work.

For longitudinal cuts, the movement of the carriage will of course be along the trackway D, and to facilitate adjustment of the carriage along the trackway I prefer to provide a relatively long arm 95, shown in Figure 5, which has a rotatable hand engaging member 96 swiveled on the free end of the arm 95.

For some woodworking operations it will be desirable to clamp the turn-table C against rotation in the table 20 of the frame B, after adjustment to the desired position. To this end I prefer to provide a movable clamping member 97, shown in Figure 6, which is reciprocably mounted in a slot 98 provided in the table portion 20 of the frame B, at the operator end of said table, as shown in Figure 1. This member 97 includes an upper portion 99 adapted to operate in said slot 98, and a portion 100 depending therebelow. Side retaining flanges 101 are provided, rigid with the member 97, at opposite sides thereof, and at the juncture between the portions 99 and 100. Each flange 101 is longitudinally slotted, at 102, and adapted to lie beneath the table 20, to which they are secured by means of supporting pins 103, shown in Figure 2. These pins extend thru the slots 102 and permit the clamping member 97 to move along the slot 98 in which the upper portion 99 is seated. A cam 105 is eccentrically pivoted at 106 to the table 20, in position so that when it is swung on its pivot it may engage the rear edge of the member 97 to move it into clamping abutment against the peripheral edge of the turn-table C, as shown in Figure 14. This cam 105 may have a handle 108 thereon, as shown in dotted lines in Figure 1.

Referring to the saw guard and back stop guide H, adapted to house the saw G when not in use as shown by dotted lines in Figure 1, the same preferably comprises a cover or top wall 110, which has vertical side walls 111 at opposite ends thereof, the lower edges of which have reduced tongues 112 which may slide in parallel slots 113 provided thru the table top 20 in parallelism with the side edges of said table. This enables the guard H to be slid longitudinally of the table from front to rear. The forward marginal portion of the top wall 110 projects beyond the front edges of the side walls 111, and beneath this overhanging portion, to the front edges of the side walls 111, is positioned a thin guide plate 112ª, preferably of metal, the opposite ends of which are apertured at 113ª for receiving screws 114 shown in Figure 7, which secures the plate 112ª across the compartment beneath the wall 110. The plate 112ª is provided with an intermediate cut away portion or opening 115, thru which the saw may pass to perform various operations. The plate 112ª, at opposite sides of this opening 115, has horizontal slots 117 and 118 therein. Elongated adjustable closures 121 and 122, preferably of wood, are provided, in aligned relation, forwardly of the plate 112ª, being provided with pins 123 with rear projecting ends that operate in guided relation in the slots 117 and 118. The proximate ends of the closures 121 and 122 may be moved into variably spaced relation to expose more or less of the recess or opening 115, depending upon the character of the sawing or woodworking operation.

Cap plates 130 and 131 are respectively provided for the tops of the closures 121 and 122, being secured in place as by screws 133, shown in Figure 7, accommodated in suitable openings 134 provided in the ends of said plates and closures. These plates 130 and 131 respectively have upstanding screw threaded shanks 140 and 141, which extend upwardly through slots 143 and 144 respectively, provided in the overhanging front portion of the top wall 110, as shown in Figure 1. Thumb nuts 145 are adjustable on said screw threaded shanks to clamp the elongated closures 121 and 122 in the desired end spaced relation with respect to the top wall 110, as will be obvious from the above description.

As shown in Figure 2, the facing end surfaces of the closures 121 and 122 may be spaced quite close together, just sufficient to permit the saw G to pass therebetween, for straight cut sawing operations. The closures 121 and 122 and the parts attached thereto may be spaced farther apart, as shown in Figure 3, to permit bevel cut sawing. On the other hand the members 121 and 122 may be moved into end abutting and closing relation, to provide a front face or surface on the guard arrangement H, which is unobstructed by projections, and has no openings therein, and which is a guide surface to permit sliding therealong of boards, when a rip sawing operation is to be performed. For such rip saw operation the turn-table C will be turned to the position shown in Figure 12, with the saw vertically positioned and disposed in a plane parallel with the front surface of the abutting closures 121 and 122, and the piece of board or other article to be rip sawed, is guided along the front surface of said closures 121 and 122, in a manner which will be apparent. Also, as shown in Figure 13, when a grooving, tenoning, or analogous woodworking operation is to be performed, the small tool to operate thereon is placed on the mandrel 90, and with the front face of the guard H closed, and the other details as shown in Figure 13, the piece to be operated upon is slipped between the front face of the guard construction, and the operation performed thereon.

From Figures 7, 8, and elsewhere, it will be observed that the bolts 120ª are provided, extending vertically upward thru each of the side walls 111, the heads of which engage beneath the table 20, below the slots 113, and the upper ends of which are threaded and may have nuts 121ª adjustable thereon to clamp the saw guard and back stop guide against longitudinal movement on the table 20.

From the foregoing description of this invention it is apparent that an improved sawing and woodworking machine has been provided, the driving mechanism of which is disposed in an out of the way position, and the angularity of the circular saw of which may be positioned to enable a facile and efficient straight cut, miter cut, bevel cut, compound cut. Straight and bevel rip sawing may be accomplished, and tenon shaping, as well as routing and dadoing may be carried out by the substitution of a suitable cutting head for the circular saw.

Various changes in the shape, size, and arrangement of parts may be made to the form of invention herein shown and described, without departing from the spirit of the invention or the scope of the claims.

I claim:

1. In a sawing machine, a table, a disc countersunk in the table and adapted to turn therein, a track mounted for axially angular adjustment on the underside of said disc, a saw unit including a motor and a saw connected thereto, a carriage for said saw unit mounted on said track and having an adjustable section for raising and lowering the saw unit on the carriage, said disc having a diametrically extending slot through which said saw may project, and means located wholly beneath said table for shifting said carriage on the track irrespective of the adjustment of the track and saw unit.

2. In a sawing machine, a table, a disc countersunk in the table and adapted to turn therein, a circular saw, a carriage for said saw carried by and beneath said disc, said disc having a diametrically extending slot through which said saw projects, means located wholly beneath said table for shifting said carriage, and a combined work rest and saw guard adjustably mounted on the table and overhanging the edge portion of said disc for housing said saw when not in use.

3. In a sawing machine, a table, a disc countersunk in the table and adapted to turn therein, a track mounted for axially angular adjustment on the underside of said disc, a motor including a tool receiving mandrel, a carriage for said motor mounted on said track and having an adjustable section for raising and lowering the motor on the carriage, said disc having a diametrically extending slot therethrough, a plurality of work rest inserts selectively fitted in said slot of the disc and having tool openings of various dimensions therein to permit the tool or mandrel to extend through the disc, and manual means for shifting said carriage on the track in the various adjustments of the motor mandrel.

4. In a woodworking machine, a table, a slotted disc countersunk in the table and adapted to turn therein, a tool carrying mandrel, means adjustably supporting said mandrel on the underside of said disc, to be positioned wholly below the disc or to be extended upwardly thru the slot in the disc and to be moved diametrically of the disc, a guard mounted for adjustment on the table over the edge portion of the disc for housing a tool carried by the mandrel, and a pair of work guide slides mounted across the front side of said guard adapted to be opened to admit passage of the tool beneath the guard and adapted to be closed to provide an uninterrupted surface against which the work may rest.

ERNEST W. BENNETT.